C. WILSON.
VALVE.
APPLICATION FILED JAN. 15, 1909.

924,207.

Patented June 8, 1909.

Witnesses:

Inventor:
Christian Wilson
by his attorney

UNITED STATES PATENT OFFICE.

CHRISTIAN WILSON, OF BROOKLINE, MASSACHUSETTS.

VALVE.

No. 924,207.  Specification of Letters Patent.  Patented June 8, 1909.

Application filed January 15, 1909. Serial No. 472,398.

*To all whom it may concern:*

Be it known that I, CHRISTIAN WILSON, a subject of the King of Denmark, residing at Brookline, in the county of Norfolk and Commonwealth of Massachusetts, have invented a new and useful Valve, of which the following is a specification.

My invention relates to an improvement in valves for steam boilers whereby a fusible plug may be used in conjunction therewith in a manner whereby upon the fusing of the plug the melted material may be expelled through the valve allowing the steam to be exhausted so as to relieve the boiler of pressure and announce the deficiency of water supply when the water has dropped to a point below the fusible plug; and it is the special object of my valve to afford a means whereby the part bearing the fusible plug may be removed and the valve opening closed automatically thereupon, thus permitting the boiler to be filled and the steam to be raised without the necessity of first inserting a new fusible plug.

My invention may be best understood by reference to the accompanying drawing in which—

Figure 1:
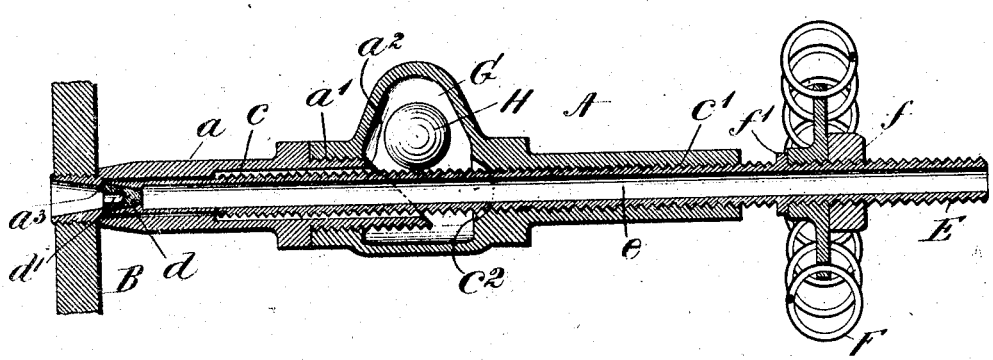
Figure 2:
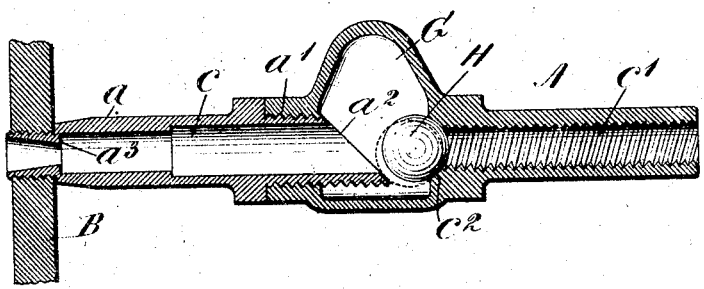

Figure 1 represents a longitudinal cross-section through the middle part of my valve attached to the side of a boiler. Fig. 2 represents the valve after the removal of the part bearing the fusible plug.

Referring now more particularly to the drawings, A represents the valve casing into which is screwed a part $a$ having a threaded sleeve $a^1$ the end of which has a downward slanting rim, $a^2$ (represented by the dotted line in Fig. 1). This part $a$ is threaded at its other end so that it may be screwed into the boiler, B, or into some tube or extension of the boiler in any common manner so that it may project merely through the casing, as shown, or well inwardly according to a common practice of attaching the nipple of fusible plugs. The part $a$ is hollow, having a passage $c$ varying in dimensions extending through it. This passage $c$ is first tapered to form the shoulder $a^3$ which affords a valve seat against which may be set the lead plug $d$ which sets in a conoidal socket in the end of the valve stem E which is threaded on the greater part of its exterior whereby it may be screwed into the threaded passage $c^1$ of the casing A. It is obvious, however, that the valve stem E may itself rest on the valve seat $a^3$ thus forming a valve. The passage $c^1$ is in alinement with the passage $c$ thus forming one continuous passage so that the valve stem E may enter the passage $c$ after passing through the passage $c^1$ and the passage $c$ is preferably so varied in dimension as to fit both the threaded and unthreaded portion of the stem E which is tubular being provided with a passage $e$ extending throughout its length and closed only by the fusible plug $d$.

The stem E is provided with a circular handle F, preferably of a common wire construction as shown, set at some distance from the end of the stem and fastened securely thereto by means of a nut $f$ which binds the handle F securely against a collar $f^1$ fast on the stem E.

The casing A is provided with a chamber G adapted to hold a heavy metal ball valve H normally supported in the elevated position shown in Fig. 1 by the stem E which traverses the chamber G. But when the stem E is removed, as shown in Fig. 2, this ball valve H will drop to the position shown by the dotted circle whence it may be forced by steam pressure into the hollow valve seat $c^2$ at the inner end of the passage $c^1$, thus checking the escape of steam and water. In dropping the ball valve H is guided toward its seat $c^2$ by the inclined surface $a^2$ which also assists in its elevation when the valve stem E is again screwed into place.

The plug $d$ I prefer to make of a peculiar construction in order that it may fuse more readily when in contact with the dry steam and be kept more cool when in contact with the water. Hence I have made a cavity $d^1$ in the plug $d$ whereby the water or hot steam may enter the plug.

The operation of my fusible plug valve, which is particularly adapted for use on automobiles where a saving of time, water and fuel is most desirable, is as follows: When the water of the boiler has dropped to the danger point below the plug $d$, so that the steam may have access thereto, the plug $d$ will be melted and expelled through the passage $e$ of the tubular stem E thus allowing the steam to escape through the passage. Now before the boiler can be filled and pressure raised again it is necessary to stop the steam outlet. This may be done by unscrewing the valve stem E which, because of the position of the handle F, may be done without danger while the steam is still escaping through the stem E. Upon the removal of the stem E to a point beyond the chamber G the ball valve H will drop into its seat $c^2$ and close the exhaust passage. This operation may be performed in a fraction of a minute thus saving much steam and hot water which, when an ordinary fusible plug exhaust is used, is blown out before the passage can be stopped, since in the case of the ordinary fusible plug exhaust the nipple in which the plug was set cannot be unscrewed from the boiler until it is cool nor can it be re-inserted with a new plug in place while the boiler is hot and waterless or the new plug will melt. The boiler must be drained and cooled, but with my device once the stem E has been withdrawn and the exhaust checked one may start pumping water into the boiler and the fire, which is reduced or extinguished upon the fusing of the plug, may now be started also. The raising of the water in the boiler will at once permit the stem E, with a fresh plug inserted therein, to be screwed back against the seat $a^3$, thus restoring to the boiler its safety applicance, or this may be done at one's convenience. It is apparent also that the use of my device which effects a saving of steam and hot water also saves thereby the expense of "firing up" when the boiler must be entirely refilled with cold water. This means a saving of about a gallon of fuel in the case of a high power steam motor car.

Having thus fully described my invention what I claim is—

1. In an apparatus of the character specified the combination of a casing, a passage through said casing, a tubular valve stem removably mounted therein, a fusible plug in said valve stem, a valve seat in said casing and a valve means fixed on said valve stem adapted to rest on said valve seat, whereby the passage through said casing may be closed.

2. In an apparatus of the character specified the combination of a casing, a passage through said casing, a tubular valve stem removably mounted therein, a valve seat in said casing and a fusible plug in said stem adapted to close the passage therein and to form a valve to rest on said valve seat.

3. In an apparatus of the character specified the combination of a casing, a passage through said casing, a tubular valve stem removably mounted therein, a fusible plug in said stem, a valve means on said stem, a chamber in said casing, a valve means in said chamber normally held in an inoperative position by said stem but adapted to fall into an operative position upon the retirement of said stem, and close the passage through said casing.

4. In a fusible plug valve the combination of a primary removable valve apparatus having an outlet normally closed by fusible metal therein but adapted to open by the fusing of said metal, and a secondary valve apparatus adapted to close upon the retirement of said primary valve apparatus.

5. In a device of the character specified the combination of a casing a threaded passage in said casing, a tubular valve stem threaded to engage the threads of said passage and means for turning said stem whereby it may be wholly removed therefrom and a fusible plug normally fixed in the end of said valve stem.

6. In an apparatus of the character specified the combination of a casing, a passage through said casing, a tubular valve stem removably mounted therein, a chamber in said casing, a ball valve, a seat for said ball valve which is normally supported in said chamber in an inoperative position by said stem, and means whereby said ball valve may, in falling, upon the retirement of said stem, be guided toward its seat to close said passage in said chamber, and upon the insertion of said stem, be assisted to its elevated position.

7. In an apparatus of the character specified the combination of a casing, a passage through said casing, a chamber in said casing, a removably mounted valve stem in said passage and normally traversing said chamber, a ball valve in said chamber normally held in inoperative suspension by said stem, a seat for said ball valve and in said chamber a member with an inclined surface adapted to engage said ball valve when falling at the retirement of said stem, and to guide said ball valve toward its seat while also adapted to facilitate the elevation of said ball valve upon the insertion of said stem.

8. In an apparatus of the character specified the combination of a casing a passage through said casing, a tubular valve stem removably mounted therein, a fusible plug in said stem and a valve means on said stem, a seat for said valve means a chamber in said casing, said chamber being normally traversed by said stem, a ball valve in said chamber normally held in an inoperative position of suspension by said stem, a seat for said ball valve, in said chamber a member with an inclined surface adapted to engage said ball valve when said ball valve falls, at the retirement of said stem, and to guide said ball valve toward its seat while also adapted to facilitate the elevation of said ball valve upon the insertion of said stem.

9. In a device of the character specified a fusible plug having a cavity therein substantially as and for the purposes described.

CHRISTIAN WILSON.

Witnesses:
DANFORTH W. COMIUS,
WILLIAM H. SMITH.